United States Patent

[11] 3,631,967

| [72] | Inventors | Vernon G. Converse, III<br>Franklin;<br>George R. Allington, Westland; Peter J. Mosher, Livonia all of Mich. |
|---|---|---|
| [21] | Appl. No. | 64,006 |
| [22] | Filed | July 15, 1970 |
| [45] | Patented | Jan. 4, 1972 |
| [73] | Assignee | Scans Associates, Inc.<br>Livonia, Mich.<br>Continuation of application Ser. No. 707,033, Feb. 21, 1968, now abandoned. This application July 15, 1970, Ser. No. 64,006 |

[54] ACCUMULATOR CONVEYOR SYSTEM
14 Claims, 8 Drawing Figs.

[52] U.S. Cl. .................................................... 198/181,
198/127 R, 198/183
[51] Int. Cl. ....................................................... B65g 15/00
[50] Field of Search ............................................. 193/35 A,
37; 198/183, 127, 181

[56] References Cited
UNITED STATES PATENTS
3,260,351  6/1966  Miller .......................... 198/138
1,852,942  4/1932  Streine ......................... 198/183

FOREIGN PATENTS
1,216,766  5/1966  Germany ....................... 198/203

Primary Examiner—Richard E. Aegerter
Assistant Examiner—Douglas D. Watts
Attorney—Gregory S. Dolgurokov ABSTRACT: This application discloses an improved conveyor adapted for use particularly but not exclusively in automated installations, which conveyor can handle load pieces of different nature without the necessity of securing the load pieces to the conveyor structure, or of being arranged on the conveyor at uniform distances or intervals; and which conveyor is capable of heavy loads and yet apply its power to the load pieces gently and gradually whenever desirable or necessary, permits accumulation of a considerable number of items without causing breakage, undesirable pileups, or jams; and in which conveyor the movement of the load pieces carried by the conveyor can be stopped selectively and such load pieces be held stationary for any desired length of time without necessity of stopping the conveyor, and in which conveyor the movement of the stopped load pieces is resumed automatically when the force that stopped the load pieces is removed.

PATENTED JAN 4 1972
3,631,967
SHEET 1 OF 4
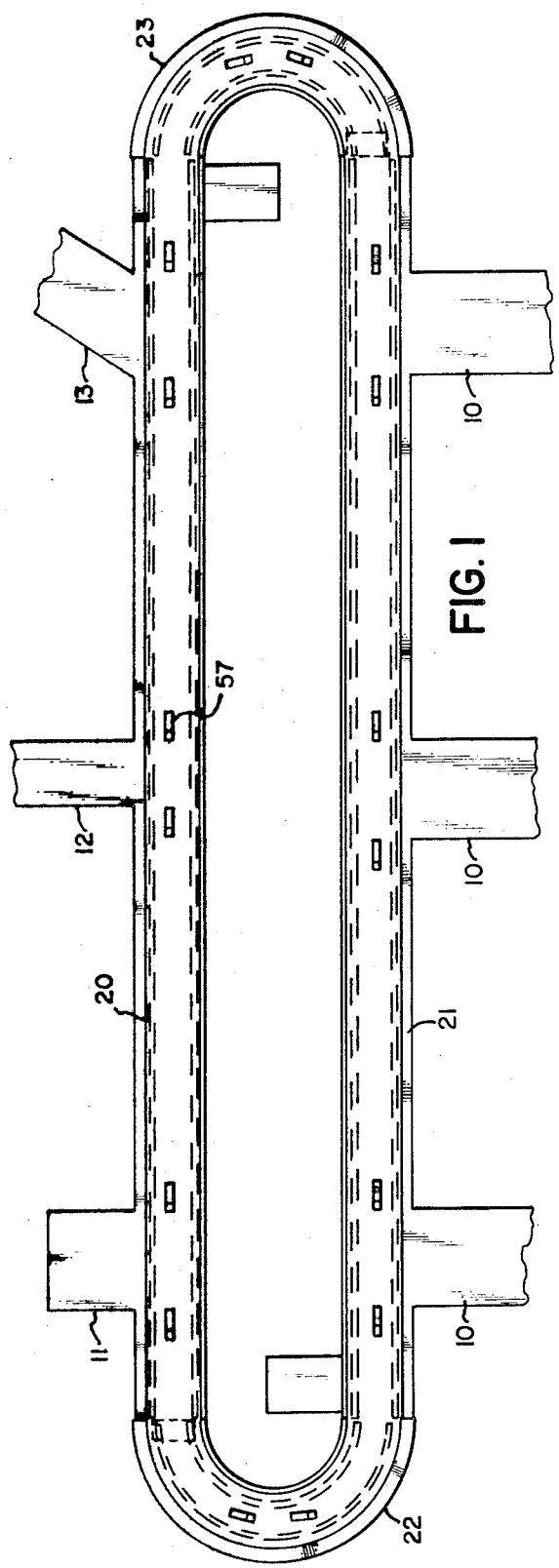
FIG. 1
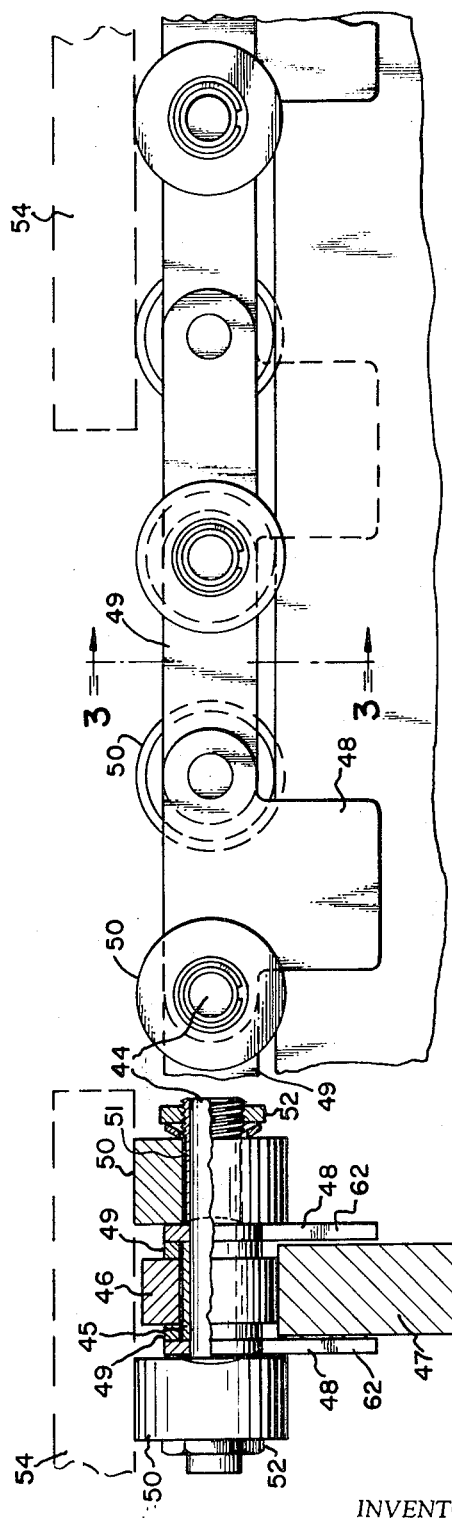
FIG. 2
FIG. 3
INVENTORS
VERNON G. CONVERSE III.
GEORGE R. ALLINGTON
PETER J. MOSHER
BY Gregory S. Dolgorukov
ATTORNEY

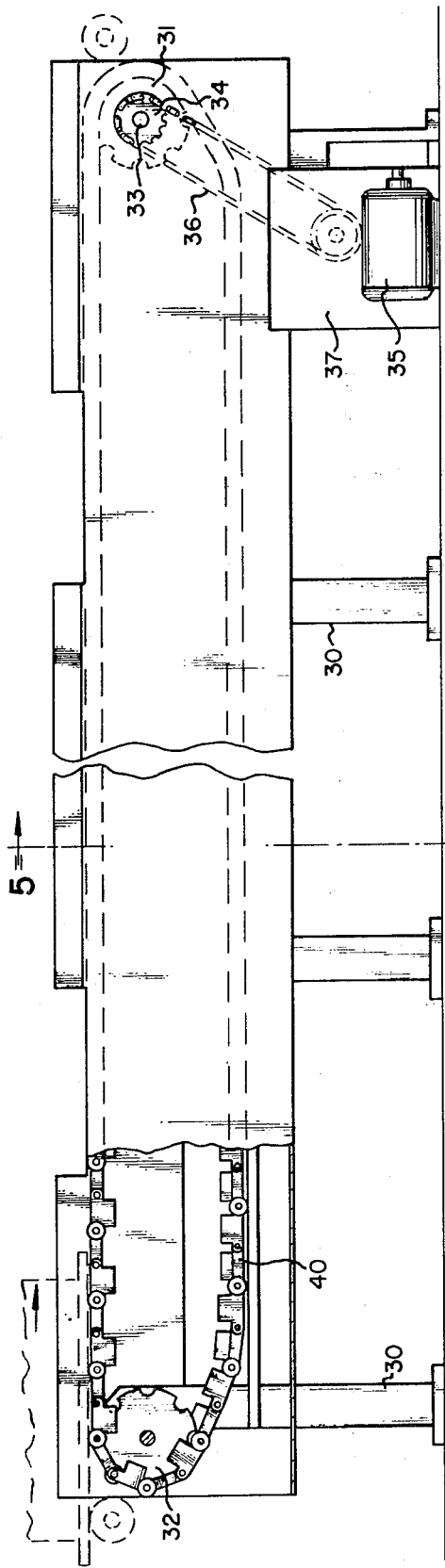
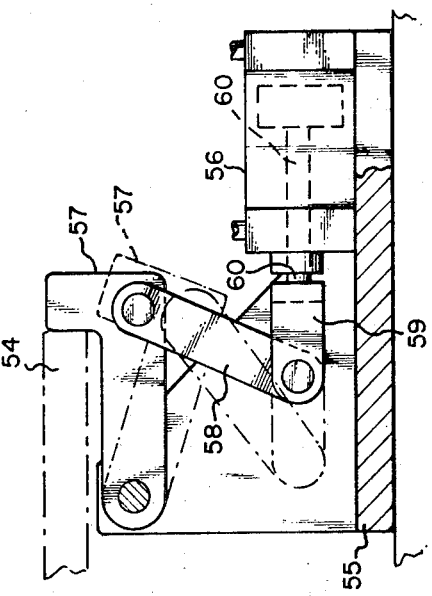
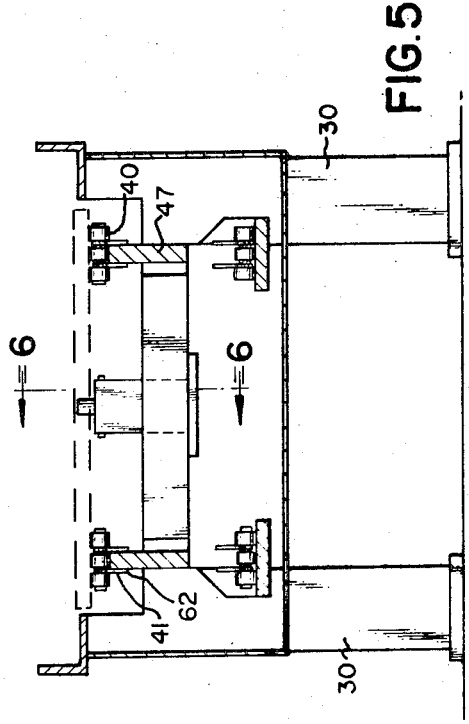
FIG. 4
FIG. 6
FIG. 5
INVENTORS
VERNON G. CONVERSE III.
GEORGE R. ALLINGTON
BY PETER J. MOSHER
ATTORNEY INVENTORS
VERNON G. CONVERSE III.
GEORGE R. ALLINGTON
PETER J. MOSHER
BY Gregory S. Dolgorukov
ATTORNEY

ACCUMULATOR CONVEYOR SYSTEM

This application is a continuation of my copending application Ser. No. 707,033 now abandoned.

This invention relates to conveyors and more particularly to a conveyor system which can operate as an independent material-handling device or as a part of an automation system.

Conventional conveyors are not fully suited for such applications and possess numerous disadvantages making their operation, as well as operation of the devices associated therewith not fully satisfactory and inefficient. Conveyors in their general construction are devices positive in nature, and they are positively driven with the aid of chains and the like. When used in combination with other devices to form automation systems such, for instance, as engine-testing installations, such conveyors receive the workpieces, in such instances automobile engines, in special fixtures which are positively connected to the conveyor structure in predetermined places and usually at fixed intervals. Such intervals have to be not less than a certain predetermined minimum, and such minimum is, in turn, determined by the longest time required for performance of the longest operation on the workpieces. Should it be required that the conveyor carry two or more types of workpieces in predetermined positions, with different operations to be performed on such workpieces, or with operations to be performed only on some of such workpieces, two or more types of fixtures or workpieces-receiving and carrying devices have to be provided on such conveyors at predetermined intervals, resulting in conveyors of excessive lengths, decreasing production, and thus creating the need for increasing the number of work stations.

When operating devices which are supplied with the workpieces by the conveyor have to select only some of the devices carried by the conveyor and let the others pass, such devices have to wait for the respective workpieces to be brought to them by the conveyor by movement through several intervals during which the operating device may be standing idle. When a workpiece approaches a position at which it has to be separated, the positive nature of its connection to the conveyor and of the conveyor itself, which is in the state of constant motion, require exceedingly fast operation of the controlled parts in order to separate the workpiece and make it go through certain movements. This fact requires exceedingly careful design of the controls, rapid acceleration and deceleration of the moving parts, thus imposing greater stresses and strains on the system than would otherwise be required, often causing breakage or rough and jerky operation of the system or its separate parts. Should separate operations be performed in a certain sequence closely following one another, performance of all such operations may have to be done within exceedingly short time which may endanger the system. To eliminate such possibilities the set speed of the conveyor may have to be reduced considerably or the intervals between the workpiece receiving and carrying fixtures has to be enlarged, both expedients having the same effect, namely, decrease of productivity of the conveyor.

One of the objects of the present invention is to provide an improved conveyor whereby the above difficulties and disadvantages are overcome and largely eliminated and an improved conveyor is provided which is capable of handling workpieces in a gentle but quick manner, with the development of its handling function moving in the direction of human skill, which capacity can be explained by a comparison of operation of artificial limb producing only simple and rough positive movements and natural limb such as an arm or leg which operate quickly, nonpositively, and are flexible in operation.

Another object of the present invention is to provide an improved conveyor system which has high power and is capable of handling heavy loads and yet applies its power to the workpieces gently and gradually wherever desirable or necessary, permits accumulation of a considerable number of items without causing breakage, undesirable pileups, or jams, and produces dissipation of such accumulations into sorting channels or processing stations in an orderly and systematic manner.

Another object of the invention is to provide an improved conveyor having such construction that the movement of the workpieces carried by the conveyor, or any of them, can be stopped selectively and such workpieces be held for any desired period of time without the necessity of stopping the conveyor.

A further object of the invention is to provide an improved conveyor adapted to receive and to move workpieces which may be extensive in weight or volume, or in both, in which conveyor the control of such workpieces may be attained by exerting forces or otherwise acting directly on such workpieces rather than on the conveyor itself, thus making it unnecessary to connect or to secure the workpieces or items of load to the conveyor structure.

A still further object of the invention is to provide an improved conveyor, particularly but not exclusively for automated installations, in the use of which the workpieces handled by the conveyor need not be spaced on the conveyor at uniform intervals, or be identical or uniform in size or shape, or be carried by the conveyor for delivery to the same kind of stations or operations.

A still further object of the invention is to provide an improved sorting conveyor which can efficiently differentiate between more than two kinds of workpieces and to sort them into corresponding number of groups and to direct them into a corresponding number of channels.

A still further object of the invention is to provide an improved conveyor in which the moving workpieces can be stopped individually or in groups at any place along the conveyor and held stationary for any desired time and thereupon moved to any desired destination, or carried further by the conveyor.

A still further object of the invention is to provide an improved conveyor in which the driving torque operating various mechanisms of the conveyor may be adjusted to any desired value and thus to provide any desired limitation thereon.

A still further object of the invention is to provide an improved conveyor of the foregoing nature which can be endless, or be one-directional and of any desired length, or be of a multiple-unit type.

It is an added object of the present invention to provide an improved conveyor of the foregoing nature which is simple in construction, safe and dependable in operation, and is relatively inexpensive to manufacture and to repair and service.

Further objects and advantages of this invention will be apparent from the following description and appended claims, reference being had to the accompanying drawings forming a part of this specification, wherein like reference characters designate corresponding parts in the several views. FIG. 1 is a plan view showing an endless conveyor embodying the present invention and adapted to sort the workpieces received by the conveyor into six (6) different groups, i.e. directing them to six (6) different channels either for further disposition therefrom to other destinations or for performance therein of different operations on the workpieces and returning them to the conveyor for performance of still other operations and discharge.

FIG. 2 is a fragmentary elevational view showing the upper side portion of one straight section of the conveyor and a workpiece carried thereon.

FIG. 3 is a fragmentary sectional view taken in the direction of the arrows on the section plane passed through the section line 3—3 of FIG. 2.

FIG. 4 is a side view of the straight section of the conveyor with the portion of the housing thereof being broken away to expose the driving chains.

FIG. 5 is a sectional view taken in the direction of the arrows on the section plane passed through the line 5—5 of FIG. 4.

FIG. 6 is a fragmentary side view taken in the direction of the arrows on the section plane passed through the line 6—6 of FIG. 5 and illustrating the construction and operation of the workpiece-stopping device.

Figure 7:
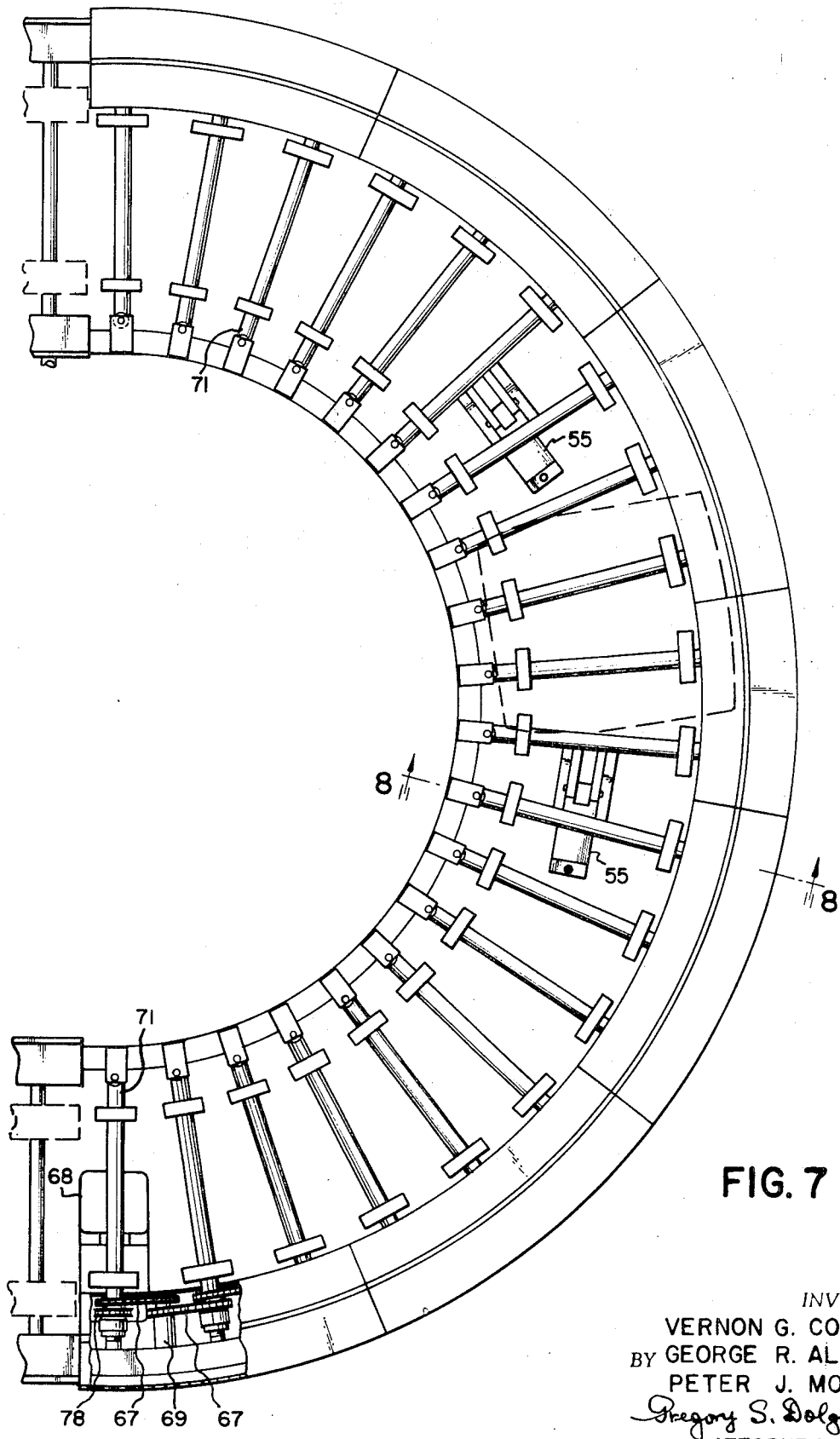
FIG. 7 is a plan view of one semicircular end section connecting the ends of two straight sections to produce an endless conveyor.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there is shown, by way of example, an improved conveyor system embodying the present invention. Referring specifically to FIG. 1, there is shown in a diagrammatic manner and in a plan view the conveyor forming a part of an automation system which includes six destinations or stations. Three of the stations, each designated by the numeral 10, are of the same nature and are multiple in number merely to increase the production. The destinations or stations 11, 12 and 13 are different and are adapted to receive workpieces for performing operations thereon which are different than those performed in the stations 10 and different than those performed in each of said separate stations. In other words, the operation performed in the station 12 is different than that performed in the station 11, or is the same operation but performed on workpieces of different kind than in the station 11. Similarly, the operation performed in the station 13 is different or is performed on different articles than in any other station in the system. Thus, the conveyor may be said to serve six stations or destinations of four different kinds.

The conveyor is of the closed or endless type, and some of the workpieces can circulate thereon many times until selected by the control means at the respective stations and removed from the conveyor either for sending to different destinations and permanently removed from the conveyor or directed to the station for performance of an operation thereon and returned to the conveyor for discharge or unloading in some other manner.

In the present embodiment, the conveyor comprises two straight sections 20 and 21 arranged parallel to each other, and two semicircular sections 22 and 23 connecting the ends of the straight sections to form a closed conveyor. The workpieces carried by the conveyor are supported thereby and are moved thereon in a yielding manner, i.e. they are not positively connected to the conveyor and are not disposed thereon at any fixed intervals but are moved thereon and can be stopped in any desired position without stopping the conveyor. When one workpiece is stopped, the workpieces behind it continue to move with the conveyor and begin accumulating behind the stopped workpiece. This feature of the conveyor is of importance and is responsible for attainment of important objects of the invention.

To attain such operation of the conveyor, the four sections thereof are each operated as a separate unit. Both the straight sections 20 and 21, and the semicircular sections 22 and 23 have yieldingly driven rollers. However, the rollers on the straight sections are rotatably mounted. Normally, they are bodily moveable but do not rotate, with desired resistance to the rotation of each individual roller being provided therein by a friction mechanism, which may be in the form of slip clutch. Thus, in carrying the workpieces the rollers move bodily but do not rotate. However, as soon as the workpiece is stopped, the rollers carrying it move with the conveyor and begin rotating, running out one by one from under the workpiece. In the semicircular sections, all rollers or shafts are mounted for rotation but are bodily stationary and are individually driven one from the other, i.e. by in-series driving connections.

Referring specifically to FIGS. 2–6 illustrating construction of one straight section, the same comprises a framework generally designated by the numeral 30 on which there are mounted two pairs of sprocket wheels 31 and 32. The sprocket wheels 31 are mounted on the shaft 33 supported in suitable bearings and carrying a smaller sprocket wheel 34. Both wheels 31 and 34 are keyed to the shaft 33. A motor 35 drives the wheel 34 through a chain drive 36 and through a reducing-gear device 37. Chains 40 and 41 of identical construction are passed over the sprocket wheels 33 and 32 of each pair thereof and are driven by the sprocket wheels 31 with the sprocket wheels 32 being idlers.

Each of the two chains 41 and 40 is arranged in a vertical plane, said planes being parallel to each other, as is best shown in FIGS. 4 and 5, and carry a plurality of roller assemblies spaced sufficiently close to each other to support the workpieces in a desired manner.

Each roller assembly comprises a shaft 44 carrying a bearing bushing 45 press fit on the shaft 44 and having a track roller 46 rotatably mounted thereon to run on the rail 47 and thus to support the shaft and the chain. Links 49 disposed on the opposite sides of the roller 46 and carried by the bearing bushing 45 are connecting links connecting the adjacent links of the chain together. The links 48 having downward extensions 62 are disposed on both sides of the rail 47 and are carried directly by the shaft 44. Load-supporting rollers 50 are carried by the shaft 44 on the bearing bushing 51 press fit on the shaft 44 and are rotatable on said bushings. Adjusting nuts 52 are adapted to hold the right-hand roller 50, against the right-hand link 48, and the bearing bushing 45 fixed longitudinally on the shaft 44. The left hand roller 50 is similarly held against the left hand link 48 and the bushing similar to the bushing 45. As shown in FIGS. 2, the rollers 50 are put on the alternate sides of the chain on different shafts. In other words, in the present embodiment each shaft 44 carries one track roller 46 and one load-supporting roller 50 on the right or the left side of the chain. The alternate arrangement of the load-supporting rollers is intended to lighten the chain and balance it. Thus, the rollers 50 are held by the respective adjusting nuts 52 against the links 48 with adjustable amount of pressure, providing certain amount of friction restricting free rotation of rollers 50 on their respective shafts.

The chain-supporting rollers 46 are always free to rotate and thus permit the chains, and therefore the entire conveyor, to move on the rails 47 without excessive friction. Rotation of the workpiece-supporting rollers 50 is, however, restricted. In carrying a workpiece such as 54, the rollers 50 move bodily but do not rotate. However, should the workpiece 54 be stopped on the conveyor by some extraneous force, with the conveyor chains continuing to move, and thus causing the rollers 50 to move bodily, the friction between the peripheries of the roller 50 and the bottom surface of the workpiece 54 is sufficient to overcome the adjusted frictional resistance of the rollers 50 thus producing sufficient torque to cause the rollers 50 to rotate and to roll out from under the workpiece 54 one by one. However, as soon as the force holding the workpiece 54 in place is removed, the frictional resistance afforded by the rollers 50 stops rotation of the rollers in contact with the workpiece 54, and the same is again carried by the conveyor at the speed of the chain.

It will now be understood in view of the foregoing that workpieces carried by the conveyor can be stopped at any position thereon by exerting a holding force directly on the workpiece. Stopping and holding of the workpiece 54 does not stop forward movement of the conveyor or movement of the other workpieces therewith until the next piece behind the stopped workpiece reaches a position at a predetermined distance behind the same and is similarly stopped and held in place. If the stopped workpieces are held linger, more and more workpieces accumulate behind them, and, in fact, all workpieces carried by the conveyor can accumulate in one place behind the second stopped workpiece and stay thereat without stopping the conveyor if the stopped workpieces are held in place for a sufficiently long time.

Means adapted to stop the workpieces on the conveyor are exemplified by the stop means best illustrated in FIG. 6. Said means comprise a frame 55 on which there is operatively mounted a fluid-operated cylinder-and-piston assembly 56 adapted to operate a stop hook 57 with the aid of a link 58 hingedly connected thereto and to the head 59 secured to the end of the piston rod 60. In FIG. 6, retracted position of the stop hook 57 is shown in dot-and-dash lines. As soon as a workpiece, the movement of which has to be interrupted for transferring such workpiece to a working station or sorting branch conveyor, reaches a certain position on the conveyor, it actuates a suitable limit switch (not shown), causing the fluid cylinder 56 to be operated and the piston rod 60 to be moved into its retracted position. In consequence thereof the stop hook 57 is moved into its position shown in FIG. 6 in solid lines, thus stopping the workpiece 54 and holding it in place. If stopping the next following, i.e. the second workpiece, is necessary, this is accomplished by the similar stopping means. Stopping means of such nature are provided on the conveyor adjacent the stations 10–13 in order to stop desired workpieces in front thereof for disposition.

It will be understood that with several kinds of workpieces being carried by the conveyor, the limit switches actuated thereby at proper stations are specially adapted to be actuated only by that particular type of workpiece and not by any other one, permitting all other workpieces to pass by and be stopped only at those stations at which the switches are of the corresponding nature.

Such results can be attained, for instance, by locating the limit switches at such different elevations as to cause them to be engaged and operated by protruding parts of the moving workpieces located at the same respective elevation, and be missed or cleared by protruding parts of the workpieces located at different elevations and intended to operate limit switches at other stations adapted to receive different workpieces. The protruding parts of the workpieces used for such purpose may be those already present in such workpieces and forming original portions thereof, or may be pieces attached to the workpieces to perform such intended functions and be removed therefrom after they served their purpose.

Provision of any "sensing" means at such stations adapted to "sense" or "detect" presence of workpieces at positions of registry with the stations or branch conveyors, such as electric eyes, may or may not be operative since their "sensing" function would depend on mere interruption of a light beam by a workpiece, and such interruption may be caused by any one of the workpieces. Generally, use of electric eyes would require more clearance between their separate beams, and therefore electric eye means may be applicable to larger workpieces only. However, with particularly high workpieces protruding way above the framework of the conveyor, it may be difficult to support a limit switch at the height necessary for its proper operation. In such cases use of electric eye signals may be advantageous.

It will also be understood that while some type of workpieces, particularly those having flat bottoms, can be placed on the conveyor directly and so moved in transferring to the working stations, workpieces of odd shapes may require adapters or pallets adapted to receive and hold them securely and be transferred to work stations with such pallets. Therefore, the numeral 54 used herein designates a workpiece or an adapter.

In the present embodiment, the straight conveyor sections do not include moveable crossmembers between the chains 40 and 41, since such crossmembers could strike the stop hook 57 and stop the conveyor when the stop hook device is operated. The chains 40 and 41 are bound laterally by the rails 47 cooperating with the guiding brackets 48. It will be understood, however, that the required results may be also attained by providing overhead stop hook means. Such stop hook means can be mounted on the structure of the stations and be moved down to stop the workpiece moving underneath. In most situations, however, the under-conveyor-type stop means are of greater advantage as producing a more compact construction in which various members operating above the conveyor are reduced to a minimum.

When the workpiece such as 54 is removed from the conveyor for working thereon or other disposition, and the space occupied by it becomes vacant, actuation of another switch (not shown) causes the fluid cylinder 56 to be operated and moved into its extended position, thus moving the stop hook 57 into its retracted position. Thereupon, the rotating rollers immediately pick up the workpiece disposed thereon and carry it further on the conveyor to its intended destination.

It will also be understood that a workpiece immediately following the workpiece stopped for transfer to a work station may also have to be stopped for transfer to a work station may also have to be stopped to prevent interference with transfer of the selected workpiece. Therefore, the stop means may be of double construction or second stop means may be provided to stop also the workpiece immediately following the workpiece selected for transfer.

The curvilinear sections, which in the present embodiment are semicircular, are composed of a plurality of bodily stationary but rotating shafts which carry the workpieces because of friction between the roller elements provided on the shafts and the bottom surfaces of the workpieces exerting, because of their weight, downward forces on the peripheral surfaces of such rollers. The individual shafts are yieldingly driven and therefore when a workpiece is stopped by exerting a holding force thereon, the shafts cease rotating and their frictional clutches begin slipping, allowing the workpieces thus affected to remain stationary but permitting continued operation of all remaining individual shafts and moving the workpieces on, except those held stationary.

Figure 8:
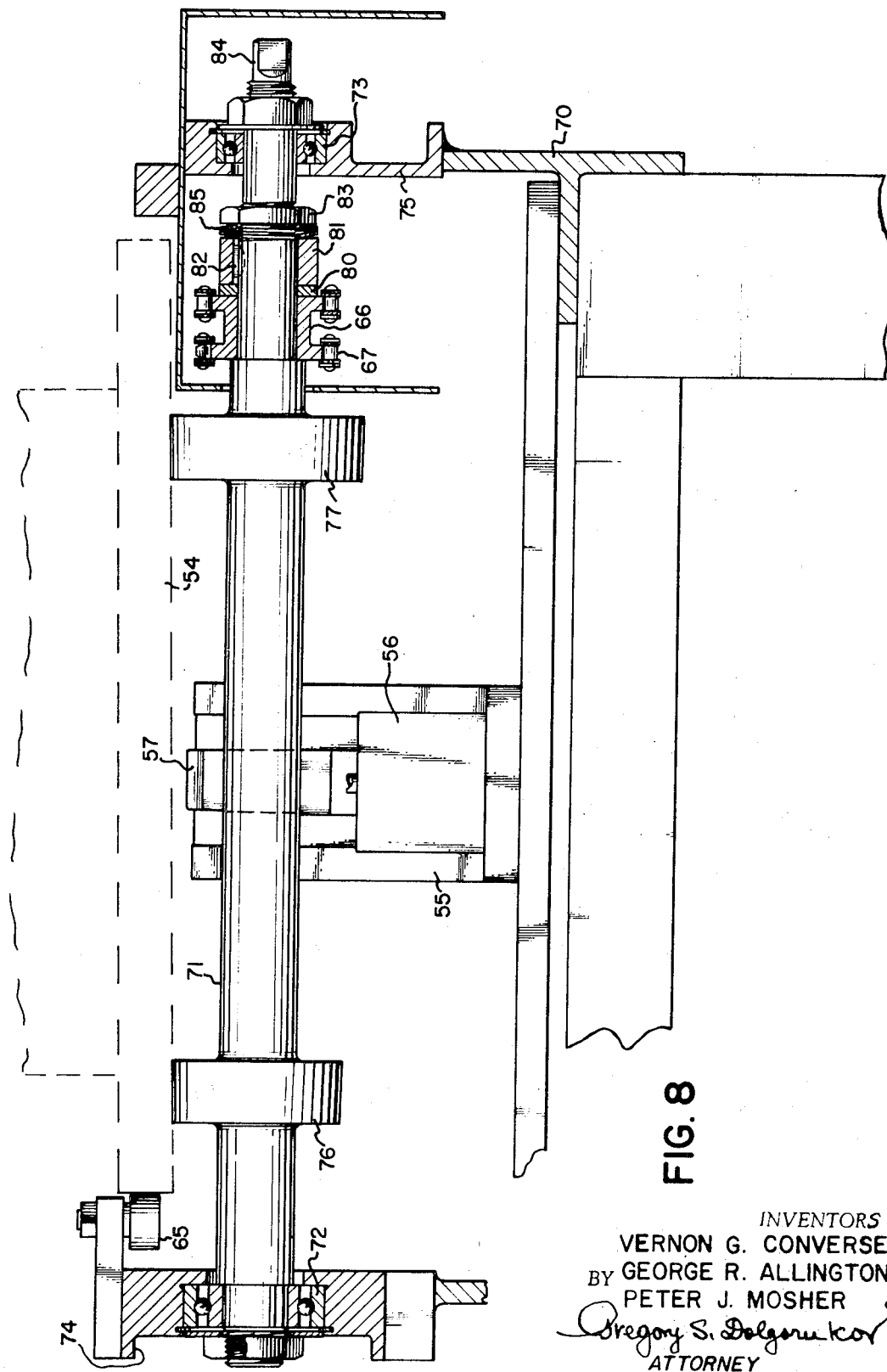
FIG. 8 is a sectional view illustrating one shaft of the semicircular section and yielding driving means therefor.

Each semicircular section comprises a frame best illustrated in FIG. 8 and designated therein by the numeral 70, in which there are operatively mounted a plurality of shafts 72 as shown in FIG. 7. One individual shaft 71 is shown in FIG. 8 on a larger scale. The shaft is journaled in bearings 72 and 73 mounted on the channel members 74 and 75 of the frame. The shaft has formed thereon rollerlike enlargements 76 and 77, with the enlargement 77 being larger than enlargement 76 in order to direct the workpiece such as 54 around a curve rather than cause it to move on a straight path. The workpiece is thus made to follow the curvilinear path and tend to lean toward the inside of the conveyor. The guide rollers such as 65 are provided on the inner channel member in order to maintain orderly movement of the workpieces and retention of their proper positions. As shown in FIG. 8, in this embodiment the workpiece is supported by a pallet, and it is the pallet that contacts such guide rollers.

Each shaft carrier a double sprocket wheel 66 rotatably mounted on the shaft and connected with individual chains such as 67, best shown in FIG. 7, with the sprocket wheels of the adjacent shafts, with the countershafts 69 being interposed inbetween. A suitable drive 68 which may be in the form of an electric motor drives the first shaft, lowermost in FIG. 7, with the aid of a chain 78. Generally, if an electric motor is used a reduction gear device is also employed.

Means are provided to drive the shafts yieldingly, exerting thereon only such torque as is necessary to move the workpieces 54 supported thereby, but to slip should any workpiece 54 be stopped thereon. Said means are exemplified by a frictional clutch provided in each shaft. Such clutch is formed by the frictional member 80 held between the sprocket member 66 and the bushing 81 keyed to the shaft as indicated at 82. An adjustment nut 83 is provided on the threaded section of the shaft. Bellville springs 85 are provided between the bushing 81 and the adjusting nut 83 in order to extend the range and sensitivity of adjustments. Operating said nut 83, any desired pressure may be exerted on the friction member 80, and any desired amount of driving friction may be produced between the sprocket member 66 and the bushing 81, thus ensuring production of desired torque and limiting it to any desired value. A flat portion 84 is provided on the end of the shaft in order to hold it with the aid of a wrench when nut 83 is being adjusted. Preferably a suitable torque wrench is used for such adjusting operation. The frictional member 80 may be bonded or otherwise secured to the sprocket member 66. Since the double sprocket members 66 are rotating free on the shafts, all shafts on the semicircular sections could remain stationary with all the chain drives operating.

A suitable stop means, which may be similar or identical to the stop device 65 provided on the straight section, is provided in one or more places on the semicircular sections for stopping the workpieces for desired operation or for unloading and loading a new workpiece in its stead.

It will be understood that the provision of the semicircular conveyor sections may be avoided, and the system be made to include only two straight sections. In such a construction, the workpieces may be transferred from one straight conveyor portion to the other by other means.

Also, provision of work station for performing certain types of work therein on some workpieces may be avoided and such work be done on the workpieces directly on the conveyor, stopping them on the conveyor, if desirable. The work stations may be provided not only at sides of the conveyor but also above it, between the chains, and in other space relations providing advantages for special situations.

Means for transferring the workpieces from the conveyor to the work stations may be in the form of a hook or a similar member operated hydraulically or pneumatically. Said means may be activated by suitable limit switches activated, in turn, by the respective workpieces. The light workpieces may be transferred by being pulled or pushed of the conveyor directly, while heavier pieces may require raising them by a suitable platform operatively arranged between the chains. Such a platform may be actuated and controlled by limit switches similarly to stop means.

There is thus provided an improved conveyor system whereby the objects of the present invention and numerous additional advantages are attained.

We claim:

1. In a moveable conveyor construction having bodily moveable and rotatable rollers, a horizontally extending track, an endless chain operatively arranged in a vertically extending plane and adapted to run on said track, said chain comprising a plurality of links and a corresponding plurality of shafts hingedly connecting said links to form an endless chain, a track roller operatively mounted on each of said shafts to run freely on said track, and one load-supporting roller of larger diameter than the track roller mounted coaxially with said track roller on each of said shafts to run adjacent the track without contact therewith and to support the load pieces carried by the conveyor but to roll out from under said load pieces if they are stopped on the conveyor, said load-supporting rollers on different shaft being arranged on alternate sides of the chain to produce a balanced construction.

2. In a moveable conveyor construction having bodily moveable and rotatable rollers, a horizontally extending track, an endless chain operatively arranged in a vertically extending plane and adapted to run on said track, said chain comprising a plurality of links and a corresponding plurality of shafts hingedly connecting said links to form an endless chain, a track roller operatively mounted on each shaft to run freely on said track, and a load-supporting roller having diameter larger than that of the track roller and mounted on each of said shafts coaxially with said track roller adjacent to the t rack but free from contact with said tack and adapted to support load pieces carried by the conveyor without said load pieces bearing on said t rack roller, said load-supporting rollers being rotatable on said shaft with a predetermined amount of friction restricting their free rotation.

3. The construction defined in claim 2 and including frictional means operatively interposed between said shaft and said load piece supporting roller to provide controlled resistance to rotation of said load piece supporting roller, whereby the load pieces carried by the conveyor can be stopped and held stationary thereon without stopping the conveyor, and to resume their motion with the load-supporting rollers when the obstruction to the movement of the load pieces with the conveyor is removed.

4. The construction defined in claim 1 and including frictional means operatively interposed between each of said shafts and said load piece supporting roller to provide controlled resistance to rotation of said load piece supporting roller, whereby the load pieces carried by the conveyor can be stopped without stopping the conveyor chain, and to resume their motion with the load-supporting rollers when the obstruction to the movement of the load pieces with the conveyor is removed.

5. A conveyor construction forming in horizontal plane an endless enclosed path to provide for both continuous and for selectively intermittent movement of load pieces on the conveyor without stopping the same conveyor, said conveyor construction comprising two straight conveyor section such as defined in claim 2 and arranged parallel to each other, and two curvilinear sections connecting the ends of said straight sections to enclose the same and to form an endless horizontally extending conveyor path, with the chains of the straight sections adapted to be moved continuously and to carry the load pieces, with the load pieces supporting rollers of said sections adapted to roll out from under the load pieces supported thereby when said load pieces are stopped without stopping the conveyor, and with each of said curvilinear sections including a plurality of bodily stationary but constantly rotating rollers, said rollers including adjustable frictional clutches adapted to move load pieces thereon but to hold said load pieces stationary thereon by providing for stoppage in said clutches, whereby the load pieces are continuously carried by the conveyor around its endless path and may be stopped selectively as well as by self-accumulation on the conveyor without stopping the same either in said straight sections or in said curvilinear sections.

6. The conveyor construction defined in claim 5 and having stop means including stop members moveable into the path of the load pieces carried by the conveyor for stopping said load pieces without interference from the moving conveyor chains or any crossmembers thereof.

7. The conveyor construction defined in claim 5 and including a plurality of work device stations provided adjacent thereto, limit switch means at said stations adapted to be operated only by the load pieces intended to be received by the respective work device stations, said devices adapted to operate on said load pieces, respectively, and means controlled by said limit switch means to transfer said workpieces respectively from the conveyor to the respective work device stations.

8. The conveyor construction defined in claim 7 and including means controlled by the condition of said load pieces in said devices stationed respectively, and adapted to transfer the load piece form its respective device station to further destination.

9. The conveyor construction defined in claim 7 with the means transferring the load pieces to their further destination being, at least in some of such device stations, adapted to return the load piece to the conveyor.

10. In a moveable conveyor construction having bodily moveable and rotatable rollers, two parallel tracks arranged in a horizontally extending plane, two endless chains arranged in parallel vertically extending planes and adapted to run on said tracks, each of said chains comprising a plurality of links, shafts hingedly connecting said links one to the other to form a unitary flexible connector, each of said shafts having mounted thereon for free rotation a track roller adapted to run freely on said track to support the respective chain without having contact with the load pieces carried by the conveyor, and load rollers of larger diameter than said track roller mounted for rotation on said shafts coaxially with said track roller and distributed in a balanced way on the chains and adapted to support the load pieces carried by the conveyor but without contact with the track, friction means operatively interposed between said shafts and said load rollers, respectively, to impose predetermined amount of friction resisting free rotation of said load rollers, and sprocket driving means for driving said chains.

11. A conveyor construction having bodily moveable and rotatable rollers, two endless chains operatively arranged in two parallel vertically extending planes, each of said chains comprising a plurality of links successively and hingedly connected together by shafts to form a unitary flexible connector, two tracks supporting said two chains, respectively, each of said link-connecting shafts carrying a roller assembly comprising a chain roller adapted to run freely on said track but to clear the load pieces carried by the conveyor, and at least one load piece supporting roller mounted on said shaft for rotation thereon and adapted to support and to carry the load pieces but to clear said chain track, friction means operatively interposed between the shaft and the load roller, respectively, to impose adjustable amount of friction yieldingly resisting free rotation of said load rollers, whereby the load pieces carried by the conveyor are supported by the load piece supporting rollers and held thereon by friction but adapted to be held stationary on the conveyor without stopping the same, said load-supporting rollers being distributed on the chains in a balanced manner.

12. The conveyor construction defined in claim 11, with the load piece supporting rollers of each chain terminating immediately adjacent the respective chain to eliminate rollers crossing from one chain to the other.

13. The conveyor construction defined in claim 11 and including adjustable frictional means operatively interposed between the shafts and the load-supporting rollers, respectively, to provide controlled resistance to rotation of said rollers thereon, whereby the weight of the load pieces creates sufficient friction to enable the load-supporting rollers to carry the load pieces on, but to hold said pieces stationary on the conveyor without stopping the conveyor if there is an obstruction to their movement thereon, with said load-supporting rollers rolling out one by one from under the load pieces by overcoming said controlled resistance to their rotation on the shafts.

14. The conveyor construction defined in claim 11, with the two conveyor chains as well as the shaft-and-rollers assemblies mounted thereon being free of cross-connections between the chains in the upper moveable portion of the conveyor, and including control members moveable into and out of the path of the load pieces carried by the conveyor to stop the movement of the selected load pieces and to hold them by acting directly on the moving load pieces without possibility of interference which cross-connection between the moving chains, if present, would offer.

* * * * *